US012671504B2

(12) United States Patent
    Bunandar et al.

(10) Patent No.: US 12,671,504 B2
(45) Date of Patent: Jun. 30, 2026

(54) PHOTONIC PROGRAMMABLE INTERCONNECT CONFIGURATIONS

(71) Applicant: Lightmatter, Inc., Boston, MA (US)

(72) Inventors: Darius Bunandar, Boston, MA (US);
    Mykhailo Tymchenko, Melrose, MA
    (US); Shashank Gupta, Newton, MA
    (US); Michael Gould, La Honda, CA
    (US); Alexander Sludds, Cambridge,
    MA (US); Carlos Dorta-Quinones,
    Medford, MA (US); Anthony Kopa,
    Somerville, MA (US); **Adam
    Mendrela**, Cambridge, MA (US);
    Clifford Chao, Palo Alto, CA (US);
    Hamid Eslampour, San Jose, CA (US);
    Ritesh Jain, Portland, OR (US);
    Chian-min Richard Ho, Palo Alto, CA
    (US); Nicholas C. Harris, Menlo Park,
    CA (US)

(73) Assignee: Lightmatter, Inc., Mountain View, CA
    (US)

( * ) Notice: Subject to any disclaimer, the term of this
    patent is extended or adjusted under 35
    U.S.C. 154(b) by 342 days.

(21) Appl. No.: 18/517,071

(22) Filed: Nov. 22, 2023

(65) Prior Publication Data

US 2024/0178923 A1     May 30, 2024

Related U.S. Application Data

(60) Provisional application No. 63/428,003, filed on Nov.
    25, 2022.

(51) Int. Cl.
    *H04B 10/80*     (2013.01)
    *G02B 6/12*      (2006.01)

(52) U.S. Cl.
    CPC ....... *H04B 10/801* (2013.01); *G02B 6/12004*
    (2013.01)

(58) Field of Classification Search
    CPC ..... G02B 6/12004; G02B 6/43; H04B 10/801
    See application file for complete search history.

(56) References Cited

U.S. PATENT DOCUMENTS

| | | | |
|---|---|---|---|
| 5,416,861 A | 5/1995 | Koh et al. | |
| 5,771,323 A | 6/1998 | Trott | |

(Continued)

FOREIGN PATENT DOCUMENTS

| | | |
|---|---|---|
| CN | 104092500 A | 10/2014 |
| CN | 106817323 A | 9/2017 |

(Continued)

OTHER PUBLICATIONS

Extended European Search Report dated Feb. 19, 2024, in connection with European Application No. 21750009.9.

(Continued)

*Primary Examiner* — Michael Stahl
(74) *Attorney, Agent, or Firm* — Wolf, Greenfield &
Sacks, P.C.

(57) ABSTRACT

Described herein are techniques for intra-chip communication within tiled photonic interposers. A photonic interposer may rely on a combination of photonic lanes and electric lanes. For example, a photonic interposer may comprise a photonic integrated circuit (PIC) lithographically patterned with an array of photonic tiles, each photonic tile comprising an on-chip communication unit. The array of photonic tiles is arranged in rows and columns. A plurality of electric lanes place the on-chip communication units of photonic tiles of different rows in electrical communication with one another. A plurality of photonic lanes place the on-chip communi- (Continued)

cation units of photonic tiles of different columns in optical communication with one another.

21 Claims, 9 Drawing Sheets

(56) References Cited

U.S. PATENT DOCUMENTS

| | | | |
|---|---|---|---|
| 5,930,429 | A | 7/1999 | Trott |
| 6,202,165 | B1 | 3/2001 | Pine |
| 6,477,285 | B1 | 11/2002 | Shanley |
| 6,650,808 | B1* | 11/2003 | Vujcic ............... H04B 10/1143 |
| | | | 385/24 |
| 7,251,386 | B1 | 7/2007 | Dickinson et al. |
| 7,310,459 | B1 | 12/2007 | Rahman |
| 7,894,699 | B2 | 2/2011 | Beausoleil |
| 8,450,186 | B2 | 5/2013 | Rong et al. |
| 9,671,572 | B2 | 6/2017 | Decker et al. |
| 9,922,887 | B2 | 3/2018 | Vermeulen et al. |
| 10,847,467 | B2 | 11/2020 | Collins et al. |
| 11,036,002 | B2 | 6/2021 | Harris et al. |
| 11,754,783 | B2 | 9/2023 | Harris et al. |
| 11,860,413 | B2 | 1/2024 | Harris et al. |
| 2002/0028045 | A1 | 3/2002 | Yoshimura et al. |
| 2004/0258408 | A1 | 12/2004 | Ramaswami et al. |
| 2005/0224946 | A1 | 10/2005 | Dutta |
| 2006/0120668 | A1* | 6/2006 | Iwasaki ............... H04B 10/801 |
| | | | 385/47 |
| 2007/0280585 | A1 | 12/2007 | Warashina et al. |
| 2008/0044128 | A1 | 2/2008 | Kish, Jr. et al. |
| 2008/0089640 | A1 | 4/2008 | Beausoleil |
| 2009/0103345 | A1 | 4/2009 | Mclaren et al. |
| 2009/0103855 | A1 | 4/2009 | Binkert et al. |
| 2010/0054671 | A1 | 3/2010 | Ban et al. |
| 2010/0266276 | A1* | 10/2010 | Zheng ................. G02B 6/2804 |
| | | | 398/43 |
| 2011/0052120 | A1 | 3/2011 | Tan et al. |
| 2011/0073989 | A1 | 3/2011 | Rong et al. |
| 2011/0128790 | A1 | 6/2011 | Sarin et al. |
| 2011/0269456 | A1 | 11/2011 | Krishnaswamy et al. |
| 2012/0149148 | A1 | 6/2012 | Dallesasse et al. |
| 2012/0177381 | A1 | 7/2012 | Dobbelaere et al. |
| 2012/0203695 | A1 | 8/2012 | Morgan et al. |
| 2013/0051725 | A1 | 2/2013 | Shinoda et al. |
| 2013/0071121 | A1 | 3/2013 | Sharapov et al. |
| 2013/0156366 | A1 | 6/2013 | Raj et al. |
| 2013/0209112 | A1 | 8/2013 | Witzens |
| 2013/0243429 | A1 | 9/2013 | Whelihan et al. |
| 2013/0292840 | A1 | 11/2013 | Shoemaker et al. |
| 2013/0308893 | A1 | 11/2013 | Zuffada et al. |
| 2014/0040698 | A1 | 2/2014 | Loh et al. |
| 2014/0043050 | A1 | 2/2014 | Stone et al. |
| 2014/0264400 | A1 | 9/2014 | Lipson et al. |
| 2014/0268980 | A1 | 9/2014 | Kim et al. |
| 2014/0294342 | A1 | 10/2014 | Offrein et al. |
| 2014/0300008 | A1 | 10/2014 | Duan et al. |
| 2014/0363124 | A1 | 12/2014 | Pelley et al. |
| 2014/0363172 | A1 | 12/2014 | Pelley et al. |
| 2015/0381273 | A1 | 12/2015 | Gloeckner et al. |
| 2016/0085038 | A1 | 3/2016 | Decker et al. |
| 2016/0181322 | A1 | 6/2016 | Mazed et al. |
| 2016/0191188 | A1 | 6/2016 | Butler |
| 2016/0216445 | A1 | 7/2016 | Thacker et al. |
| 2016/0252688 | A1 | 9/2016 | Barwicz et al. |
| 2017/0108655 | A1 | 4/2017 | Zarbock et al. |
| 2017/0160474 | A1 | 6/2017 | Mahmoodian et al. |
| 2017/0194309 | A1 | 7/2017 | Evans et al. |
| 2018/0045885 | A1 | 2/2018 | Canali et al. |
| 2019/0162901 | A1 | 5/2019 | Yu et al. |
| 2019/0189603 | A1 | 6/2019 | Wang et al. |
| 2019/0310433 | A1 | 10/2019 | Yoo et al. |
| 2019/0335252 | A1 | 10/2019 | Ryan |
| 2019/0363797 | A1 | 11/2019 | Peterson et al. |
| 2020/0006304 | A1 | 1/2020 | Chang et al. |
| 2020/0111720 | A1 | 4/2020 | Wan et al. |
| 2020/0284981 | A1 | 9/2020 | Harris et al. |
| 2021/0096311 | A1 | 4/2021 | Yu et al. |
| 2021/0118853 | A1 | 4/2021 | Harris et al. |
| 2021/0202562 | A1 | 7/2021 | Chang et al. |
| 2021/0215897 | A1 | 7/2021 | Epitaux et al. |
| 2021/0242124 | A1 | 8/2021 | Kannan et al. |
| 2021/0278590 | A1 | 9/2021 | Harris et al. |
| 2021/0375829 | A1 | 12/2021 | Or-Bach et al. |
| 2022/0004029 | A1* | 1/2022 | Meng ..................... G02F 1/025 |
| 2022/0109075 | A1 | 4/2022 | Byrd et al. |
| 2022/0148627 | A1 | 5/2022 | Meade et al. |
| 2023/0085268 | A1 | 3/2023 | Harris et al. |
| 2023/0114842 | A1 | 4/2023 | Harris et al. |
| 2023/0114847 | A1 | 4/2023 | Harris et al. |
| 2023/0296838 | A1* | 9/2023 | Lazovsky ........... G06N 3/0675 |
| | | | 385/14 |
| 2023/0308188 | A1 | 9/2023 | Dorta-Quinones et al. |
| 2023/0314711 | A1 | 10/2023 | Eslampour et al. |
| 2023/0314742 | A1 | 10/2023 | Dorta-Quinones et al. |
| 2023/0358957 | A1 | 11/2023 | Harris et al. |
| 2023/0388024 | A1 | 11/2023 | Tymchenko et al. |
| 2023/0400632 | A1 | 12/2023 | Harris et al. |
| 2023/0408764 | A1 | 12/2023 | Harris et al. |
| 2024/0353614 | A1* | 10/2024 | Bunandar ........... H04B 10/802 |
| 2025/0076572 | A1* | 3/2025 | Winterbottom ........ G06N 10/20 |

FOREIGN PATENT DOCUMENTS

| | | |
|---|---|---|
| EP | 0547262 A1 | 6/1993 |
| EP | 2212887 A1 | 8/2010 |
| EP | 3159721 A1 | 4/2017 |
| JP | H07-98463 A | 4/1995 |
| JP | 2005-502127 A | 1/2005 |
| JP | 2011-501238 A | 1/2011 |
| JP | 2011-503760 A | 1/2011 |
| JP | 2015-062027 A | 4/2015 |
| JP | 2018-506072 A | 3/2018 |
| JP | 2018-093007 A | 6/2018 |
| JP | 2018-195723 A | 12/2018 |
| KR | 10-2010-0095515 A | 8/2010 |
| TW | 508834 B | 11/2002 |
| WO | WO 2011/143548 A2 | 11/2011 |
| WO | WO 2016/008771 A1 | 1/2016 |
| WO | WO 2019/132970 A1 | 7/2019 |

OTHER PUBLICATIONS

Extended European Search Report dated Nov. 4, 2022, in connection with European Application No. 20766814.6.

International Preliminary Report on Patentability for International Application No. PCT/US2020/021209, mailed Sep. 16, 2021.

International Search Report and Written Opinion for International Application No. PCT/US2020/021209, mailed Jul. 6, 2020.

International Search Report and Written Opinion mailed Jan. 18, 2023, in connection with International Application No. PCT/US2022/046379.

International Search Report and Written Opinion mailed Nov. 29, 2023, in connection with International Application No. PCT/US23/65007.

Invitation to Pay Additional Fees dated Aug. 25, 2023, in connection with International Application No. PCT/US2023/065007.

Invitation to Pay Additional Fees for International Application No. PCT/US2020/021209, mailed May 1, 2020.

Singapore Search Report and Written Opinion dated Dec. 1, 2023, in connection with Singapore Application No. 11202108868T.

Beausoleil et al., Nanoelectronic and nanophotonic interconnect. Proceedings of the IEEE. Feb. 2008;96(2):230-47. doi:10.1109/JPROC.2007.911057.

Bell, Shane et al., TILE64—Processor: A 64-Core SoC with Mesh Interconnect, 2008 IEEE. International Solid-State Circuits Conference—Digest of Technical Papers, Feb. 2008, pp. 1-3, DOI:10.1109/ISSCC.2008.4523070.

Fujikata et al., LSI on-chip optical interconnection with Si nanophotonics. Extended Abstracts of the 2007 International Conference on Solid State Devices and Materials. 2007. pp. 276-277.

(56) References Cited

OTHER PUBLICATIONS

Grigalunas, Tell Me—What Is Wafer Dicing? Eastern States Components, LLC. Sep. 26, 2017. 2 pages. URL:https://www.escomponents.com/blog/2017/9/26/tell-me-what-is-wafer-dicing [retrieved Jul. 13, 2020].

Orcutt et al., Open foundry platform for high-performance electronic-photonic integration. Optics Express. May 21, 2012;20(11).11 Pages.

Udipi et al., Combining memory and a controller with photonics through 3D-stacking to enable scalable and energy-efficient systems. 38th Annual International Symposium on Comupter Architecture (ISCA). Jun. 8, 2011;425-436.

Wada, Electronics and Photonics Convergence on Si CMOS Platform. Proc. of SPIE. 2004;5357:16-24.

Young et al., Optical technology for energy efficient I/O in high performance computing. IEEE Communications Magazine. Oct. 2010;48:184-91.

\* cited by examiner

PHOTONIC PROGRAMMABLE INTERCONNECT CONFIGURATIONS

RELATED APPLICATIONS

This application claims the benefit under 35 U.S.C. § 119(e) of U.S. Provisional Application Ser. No. 63/428,003, filed on Nov. 25, 2022, entitled "PHOTONIC PROGRAMMABLE INTERCONNECT CONFIGURATIONS," which is hereby incorporated herein by reference in its entirety.

BACKGROUND

Computer systems include random-access memories (RAM) for storing data and machine code. RAMs are typically volatile memories, such that the stored information is lost when power is removed. In modern implementations, memories take the form of integrated circuits. Each integrated circuit includes several memory cells. To enable access to stored data and machine code, memories are placed in electrical communication with processors. Typically, these electrical communications are implemented as metal traces formed on the substrates on which the memories and the processors are disposed.

SUMMARY OF THE DISCLOSURE

Some embodiments relate to a photonic interposer, comprising a photonic integrated circuit (PIC) lithographically patterned with an array of photonic tiles, each photonic tile comprising an on-chip communication unit, wherein the array of photonic tiles is arranged in rows and columns; a plurality of electric lanes placing the on-chip communication units of photonic tiles of different rows in electrical communication with one another; and a plurality of photonic lanes placing the on-chip communication units of photonic tiles of different columns in optical communication with one another.

In some embodiments, the array comprises a first row of photonic tiles and a second row of photonic tiles adjacent the first row, wherein the photonic tiles of the first row are of a first type and the photonic tiles of the second row are of a second type different from the first type.

In some embodiments, the second type of photonic tiles is a mirrored version of the first type of photonic tiles.

In some embodiments, the electric lanes do not cross the mid-planes of the photonic tiles of either the first or the second row.

In some embodiments, the array comprises a first row of photonic tiles and a second row of photonic tiles adjacent the first row, wherein the photonic tiles of the first row and the photonic tiles of the second row are of the same type.

In some embodiments, the electric lanes cross respective mid-planes of the photonic tiles of the first row.

In some embodiments, the photonic interposer further comprises analog repeaters, coupled to the electric lanes, configured to transmit electric signals across boundaries of adjacent tiles.

In some embodiments, each photonic tile of the PIC comprises photonic nodes optically coupled to the photonic lanes, each photonic node comprising a controllable optical switch configured to selectively couple photonic tiles of the same row with each other.

In some embodiments, each photonic node further comprises a transceiver configured to perform electrical-optical conversion.

In some embodiments, the photonic interposer further comprises a plurality of electronic dies disposed on the PIC, each electronic die being coupled to a respective photonic tile of the array, wherein the electrical lanes and the photonic lanes permit communication among the plurality of dies.

In some embodiments, each photonic tile comprises a fiber coupled configured to connect to a respective optical fiber.

Some embodiments relate to a photonic interposer, comprising: a photonic integrated circuit lithographically patterned with an array of photonic tiles, each photonic tile comprising an on-chip communication unit, wherein the array of photonic tiles is arranged in rows and columns; and a controller configured to control the on-chip communication units of the photonic tiles to perform inter-tile communication between adjacent rows of the array electrically and to perform inter-tile communication between adjacent columns of the array optically.

In some embodiments, controlling the on-chip communication units comprises transferring data from a source photonic tile positioned at a first row and a first column to a destination photonic tile positioned at a second row and a second column, wherein transferring the data comprises driving, using the data, a photonic lane coupling the source photonic tile to an intermediate photonic tile positioned at the first row and the second column; and driving, using the data, an electric lane coupling the intermediate photonic tile to the destination photonic tile.

In some embodiments, transferring the data further comprises performing optical-electrical conversion on the data at the intermediate photonic module.

In some embodiments, controlling the on-chip communication units comprises transferring data from a source photonic tile positioned at a first row and a first column to a destination photonic tile positioned at a second row and a second column, wherein transferring the data comprises: driving, using the data, an electrical lane coupling the source photonic tile to an intermediate photonic tile positioned at the second row and the first column; and driving, using the data, a photonic lane coupling the intermediate photonic tile to the destination photonic tile.

In some embodiments, controlling the on-chip communication units comprises transferring data from a first electronic die coupled to a first photonic tile to a second electronic die coupled to a second photonic tile.

In some embodiments, controlling the on-chip communication units comprises performing a memory read operation between a processor die coupled to the source photonic tile and a memory die coupled to the destination photonic tile.

Some embodiments relate to a method of controlling a photonic integrated circuit comprising an array of photonic tiles, wherein the array of photonic tiles is arranged in rows and columns. The method comprises transferring data from a source photonic tile of the array positioned at a first row and a first column to a destination photonic tile of the array positioned at a second row and a second column, wherein transferring the data comprises: driving, using the data, a photonic lane coupling the source photonic tile to an intermediate photonic tile of the array positioned at the first row and the second column; and driving, using the data, an electric lane coupling the intermediate photonic tile to the destination photonic tile.

In some embodiments, transferring the data further comprises performing optical-electrical conversion on the data at the intermediate photonic module.

In some embodiments, transferring the data permits a memory read operation between a processor die coupled to the source photonic tile and a memory die coupled to the destination photonic tile.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

I. Overview

Figure 1:
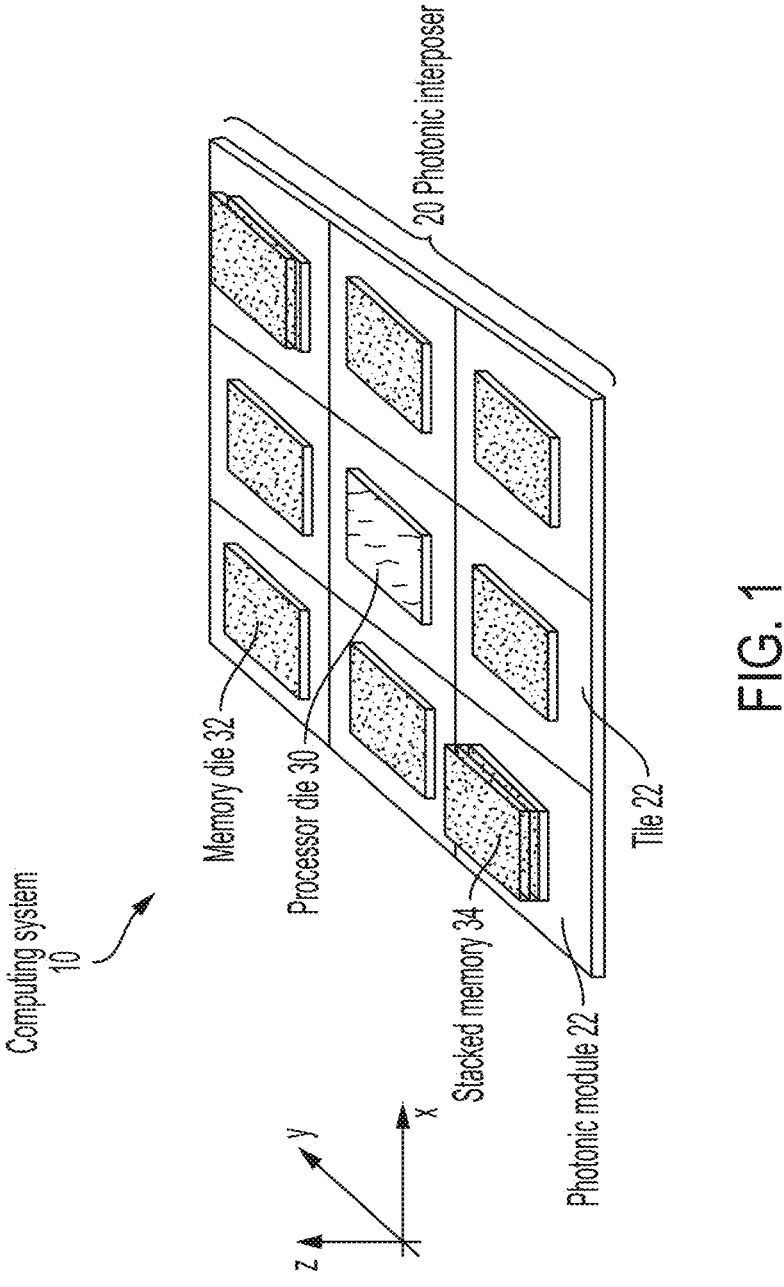
FIG. 1 is a perspective view of a photonic interposer supporting a plurality of electronic dies, in accordance with some embodiments.

Described herein are techniques for intra-chip communication within tiled photonic interposers. Tiled photonic interposers enable low-power, high-bandwidth communication, and are tiled in that they use "photonic tiles" (also referred to herein as "photonic modules" or simply as "tiles"). Each tile includes photonic circuits that can be programmed based on the needs of a particular computer architecture. In essence, each tile can serve as a communication node in a computing system. At each node, there may be one or more digital processor chips, one or more analog accelerators, one or more photonic accelerators, one or more memory chips, one or more networking chips, or other devices.

The inventors have recognized and appreciated a challenge that limits the scalability of photonic interposers. Although photonic interposers arranged according to 1-dimensional schemes (e.g., in blocks of 3×1 tiles, 5×1, 10×1, etc.) may be sufficient for some particular applications, arranging interposers according to 2-dimensional schemes (e.g., in blocks of 3×3 tiles, 5×3, 5×6, etc.) opens up computer architectures that may not be feasible using 1-dimensional schemes, such as 2D hypertoroid architectures. Yet, the ability to deliver data in two dimensions in the optical domain is limited by the performance of waveguide crossings. A waveguide crossing is as an optical structure that allows two waveguides to intersect one another, ideally without affecting the integrity of the optical signals as they pass through the intersection. In reality, waveguide crossings suffer from insertion loss and crosstalk. Insertion loss (which can be viewed as a loss of optical power) arises because part of the energy carried by an optical mode, when passing through an intersection, experiences scattering produced by the non-uniform geometry of the intersection. As a result, every time an optical signal passes a waveguide crossing, its power decreases. This limits the total number of crossings that an optical signal can pass through without resulting in significant loss of data. Similarly, crosstalk (the process by which part of the energy carried by an optical signal inadvertently couples to the intersecting waveguide) can also deteriorate the performance of a photonic network.

Although significant progress has been made to reduce the insertion loss and crosstalk produced by a waveguide crossing, some of these solutions require several levels of photonic waveguides positioned at different planes of a substrate. For example, a waveguide crossing may include a waveguide positioned in a lower plane and extending along the x-axis, and another waveguide positioned in a higher plane and extending along the y-axis. Because the waveguides interest in different planes (similar to a bridge extending over a road), crosstalk and insertion loss are reduced. Unfortunately, requiring several levels of photonic waveguides positioned at different planes of a substrate has challenges of its own. First, it increases manufacturing costs because it requires several etchable layers of semiconductor material. Second, it requires structures that can couple light vertically from one plane to another, and these structures tend to be very long, thus taking up valuable real estate.

The inventors have developed 2-dimensional tiled photonic interposers that can deliver data to any location of the interposer without necessarily relying on waveguide crossings (although a small number of waveguide crossings may still be present). Instead, the photonic interposers developed by the inventors and described herein rely on a combination of photonic lanes and electric lanes. Photonic lanes carry data in the optical domain, and can encompass photonic waveguides, photonic couplers, photonic switches, and free-space optics bridges, among other photonic components. On the other hand, electric lanes carry data in the electric domain via analog signals, and can encompass conductive traces, vias, electronic switches, and analog repeaters, among other electronic components.

In some embodiments, a photonic interposer is designed so that photonic lanes extend in one direction and electric lanes extend in the orthogonal direction. For example, photonic lanes may couple a tile in a photonic interposer to the other tiles of the same row while electric lanes may couple a tile to the other tiles of the same column. It should be noted that the denomination "columns" and "rows" should not be interpreted rigidly to mean that columns always extend in the vertical direction (the y-axis) and rows always extend in the horizontal direction (the x-axis), as the opposite is also possible. Allowing data traveling in orthogonal directions to use different carriers (optical vs. electric) eliminates or at least reduces the reliance on optical crossings, thus addressing the problems described above.

II. Photonic Tiles

The photonic interposers described herein are engineered in a way that limits manufacturing costs. These platforms may rely on the use of common photomask sets (or at least one common photomask) to fabricate multiple tiles. This approach reduces costs in two ways. First, it reduces additional costs that would otherwise be incurred in procuring several different photomask sets. Second, it enables fabrication of tiles using standard semiconductor foundries that require that the same photomask set (or at least one photomask) be used across an entire wafer. Designing tiles that share at least one photomask enables fabrication of many tiles on the same semiconductor wafer while leveraging standard, low-cost step-and-repeat manufacturing processes. Thus, in some embodiments, the tiles are photolithographically patterned instantiations (shots) of a common template tile that are stitched together in a 1D or a 2D arrangement. Some embodiments involve two template tiles, so that each tile of an interposer is formed either as an instantiation of the first template tile or an instantiation of the second template tile. Tiles of different templates may alternate in a row-by-row fashion, for example, such that neighboring rows of tiles are of different types. In another example, the same template photonic tile is used across the entire photonic interposers, but the tiles of adjacent rows are stamped as mirrored versions of each other. A tile may be 24.8 mm×32 mm in size (for example), and can support heterogeneous technologies (e.g., general-purpose processors, GPUS, DRAM/HBM stacks, or custom accelerators).

FIG. 1 illustrates an example computing system based on a photonic interposer with nine tiles arranged in three rows and three columns, in accordance with one example. Computing system 10 includes a photonic interposer 20 patterned with nine photonic tiles 22. Photonic interposer 20 is implemented as a photonic integrated circuit (PIC), for example using silicon photonics.

This photonic interposer supports one processor die (30) positioned in the middle of photonic interposer 20, and eight memory nodes surrounding the processor die, although other computer architectures are possible. Some of the memory nodes include a single memory chip (see for example memory die 32). Other memory nodes include a stacked memory including multiple vertically stacked memory dies (see for example stacked memory 34), thus forming an HBM (high-bandwidth memory). The dies are stacked on top of portions of the PIC that define the tiles. A die can communicate with the underlying tile electronically (e.g., using through-silicon vias, copper pillars, micro-bumps, ball-grid arrays or other electrical interconnects) and/or optically (e.g., using grating couplers, prisms, lenses or other optical couplers).

As described in detail further below, tiles may be patterned to include photonic and electric lanes, and on-chip communication units, among other possible components. These units selectively place the die of that particular node in communication with any other die of the computing system, using a combination of electric and photonic lanes depending on the relative location of the source tile and the destination tile on the grid. For example, a read operation between processor die 30 and stacked memory 34 may involve transfer of data from the tile that supports stacked memory 34 (the source tile) to the tile immediately to the right (the intermediate tile) using an optical lane, and transfer of data from the intermediate tile to the tile that supports processor die 30 (the destination tile) using an electric lane.

Figure 2:
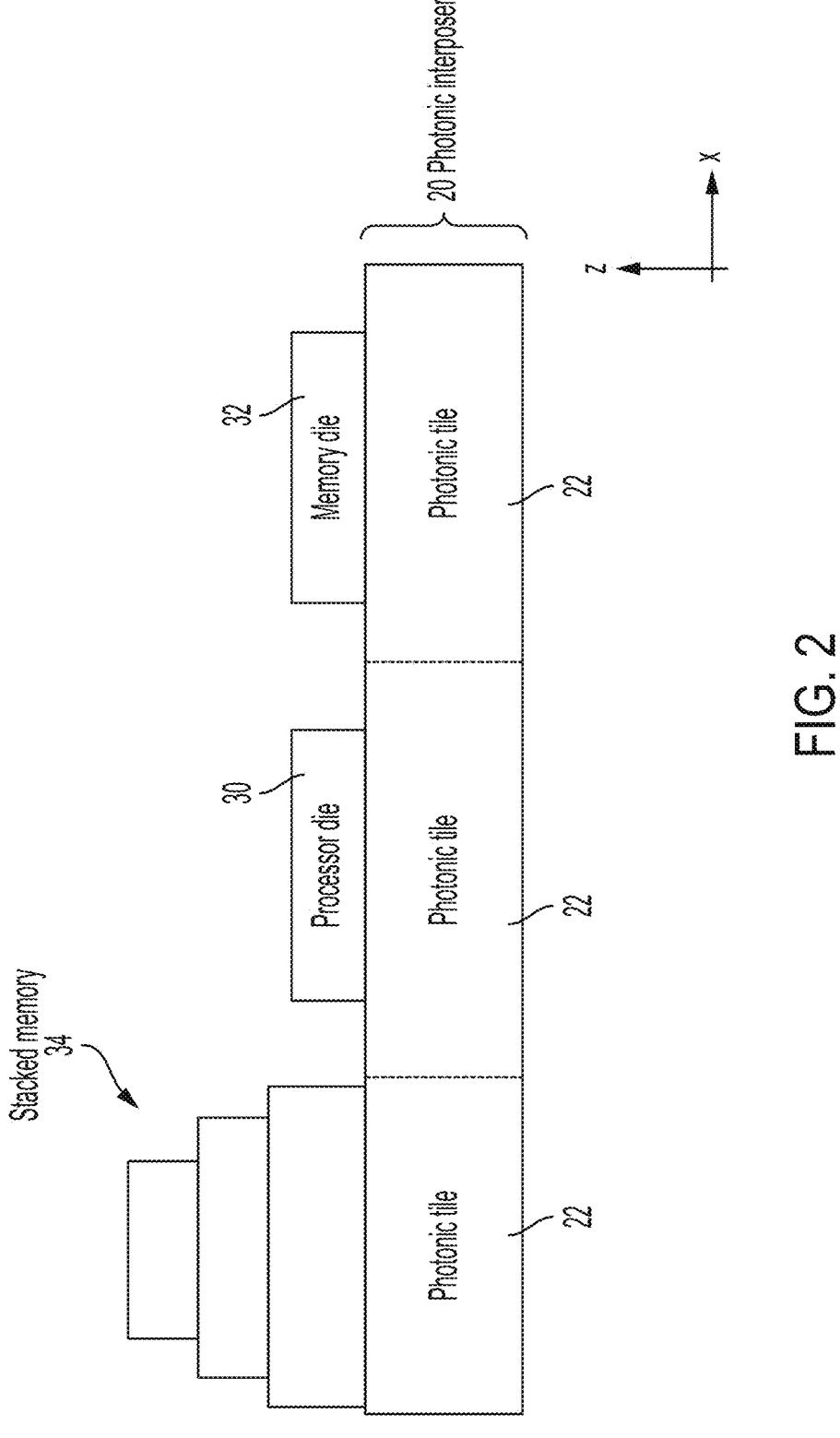
FIG. 2 is a side view of a photonic interposer supporting a plurality of electronic dies, in accordance with some embodiments.

FIG. 2 is a cross sectional view of another example photonic interposer. As shown, photonic tiles 22 are formed photolithographically as part of interposer 20. Each tile supports a corresponding electric die (although one tile may support more than one die and/or some tiles may be unoccupied). Communication between the electronic dies occurs through the tiles of photonic interposer 20.

III. Communication Lanes

Figure 3:
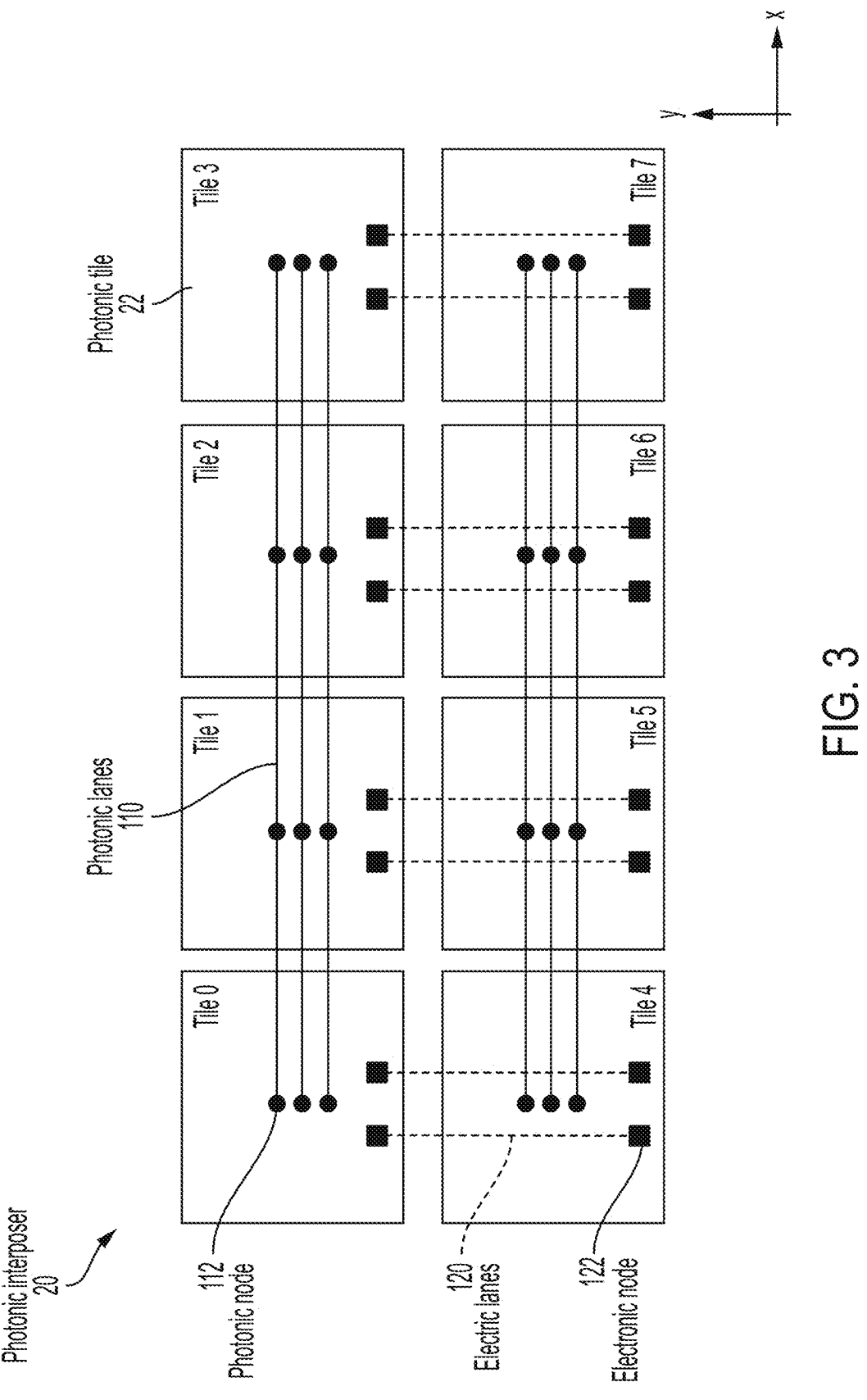
FIG. 3 is a top view of a photonic interposer having photonic lanes and electric lanes, in accordance with some embodiments.

FIG. 3 is a schematic top view of a photonic interposer having photonic lanes and electric lanes, in accordance with some embodiments. This example depicts a photonic interposer having two rows and four columns (although any other 2-dimensional arrangement is possible) of photonic tiles. In this example, rows extend in the direction parallel to the x-axis and columns extend in the direction parallel to the y-axis. As described above, the tiles are patterned on a common photonic integrated circuit photolithographically.

The tiles of the first row (labelled 0, 1, 2 and 3) communicate with each other via photonic lanes 110. Similarly, the tiles of the second row (labelled 4, 5, 6 and 7) communicate with each other via another set of photonic lanes 110. Photonic nodes 112 represent points of connection from a tile to the photonic lanes. Each photonic node may include, for example, one or more programmable photonic switches configured to direct optical signals to the desired destination. Additionally, each photonic node may include photonic transceivers configured to perform data conversion from the optical domain to the electrical domain and vice versa. A photonic lane may include photonic waveguides monolithically integrated as part of the tiles. Optical communication across the boundaries of adjacent tiles may be supported by a continuous, uninterrupted waveguide or by a free-space bridge. In some embodiments, there may be hundreds or thousands of photonic lanes coupling the tiles with one another.

Tiles of the same column (e.g., tiles 0 and 4) communicate with one another via electric lanes 120, which may include conductive traces, and optionally vias to support communication between multiple levels of conductive traces. Electronic nodes 122 represent points of connection from a tile to the electric lanes. Each electronic node may include, for example, analog driver, an analog repeater and/or one or more programmable electronic switches configured to direct electric signals to the desired destination. In some embodiments, there may be hundreds or thousands of electric lanes coupling the tiles with one another.

In some embodiments, all the tiles of a photonic interposer 20 may be of the same type (e.g., may all be photolithographically patterned shots of the same reticle). In other embodiments, different tiles may be of different types. For example, the tiles of the first row may be formed as multiple shots of the same template reticle, and the tiles of the second row may be formed as multiple shots of the same template reticle but mirrored (e.g., upon a 180 degree rotation). As a result, the second row is a mirror image of the first row. Alternatively, the tiles of the second row may be formed as multiple shots of another template reticle.

Allowing data traveling in orthogonal directions to use different carriers (optical vs. electric) improves upon photonic interposers in which data is carried optically in all directions in that it eliminates or at least reduces the reliance on optical crossings. As discussed above, optical crossings can limit the performance of an interposer because they produce insertion loss and crosstalk.

Figure 4:
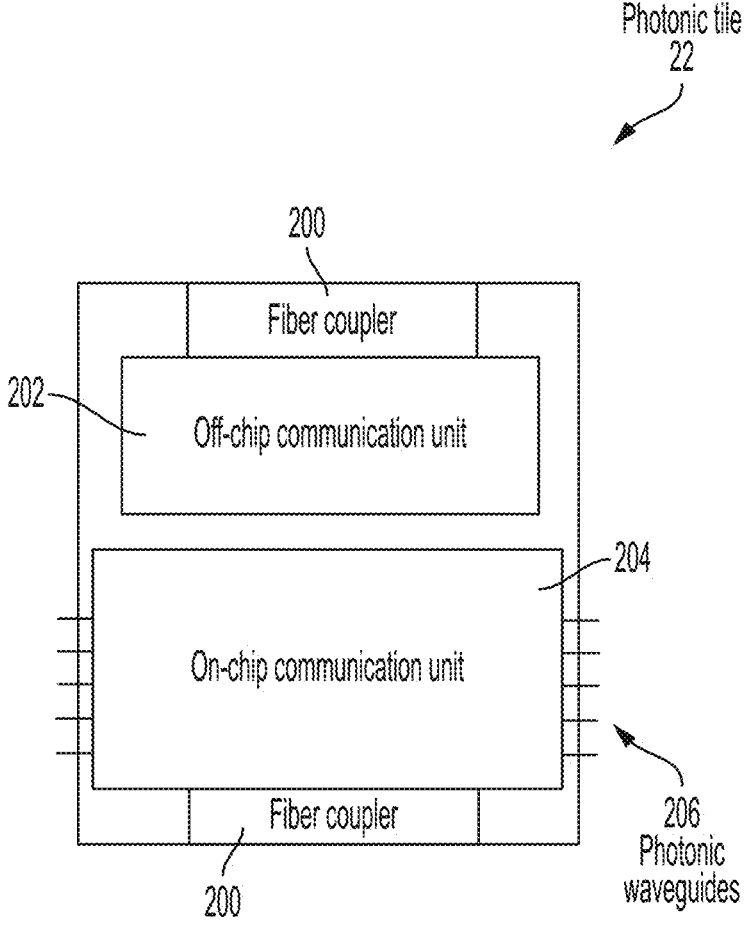
FIG. 4 is a top view of an example of a photonic tile, in accordance with some embodiments.

FIG. 4 illustrates an example of a photonic tile, in accordance with some embodiments. Photonic tile 22 includes an on-chip communication unit 204 configured to permit communication with the other tiles of the PIC, and an off-chip communication unit 202 configured to permit communication outside the PIC. Fiber couplers 200 allow connection to optical fibers for off-chip communication. In one example, the fiber couplers may be edge couplers, and therefore may be positioned at the edge of a tile as shown in FIG. 4. In another example, the fiber couplers may be out-of-plane couplers (e.g., grating couplers), removing the requirement that the couplers be positioned at the edge of the tile. The fiber couplers are coupled to off-chip communication unit 202. Both the photonic nodes 112 and the electronic node 122 illustrated in FIG. 3 may be part of on-chip communication unit 204. Photonic waveguides 206 (which may form part of the photonic lanes described in connection with FIG. 3) may extend through (and away from) on-chip communication unit 204.

Figure 5:
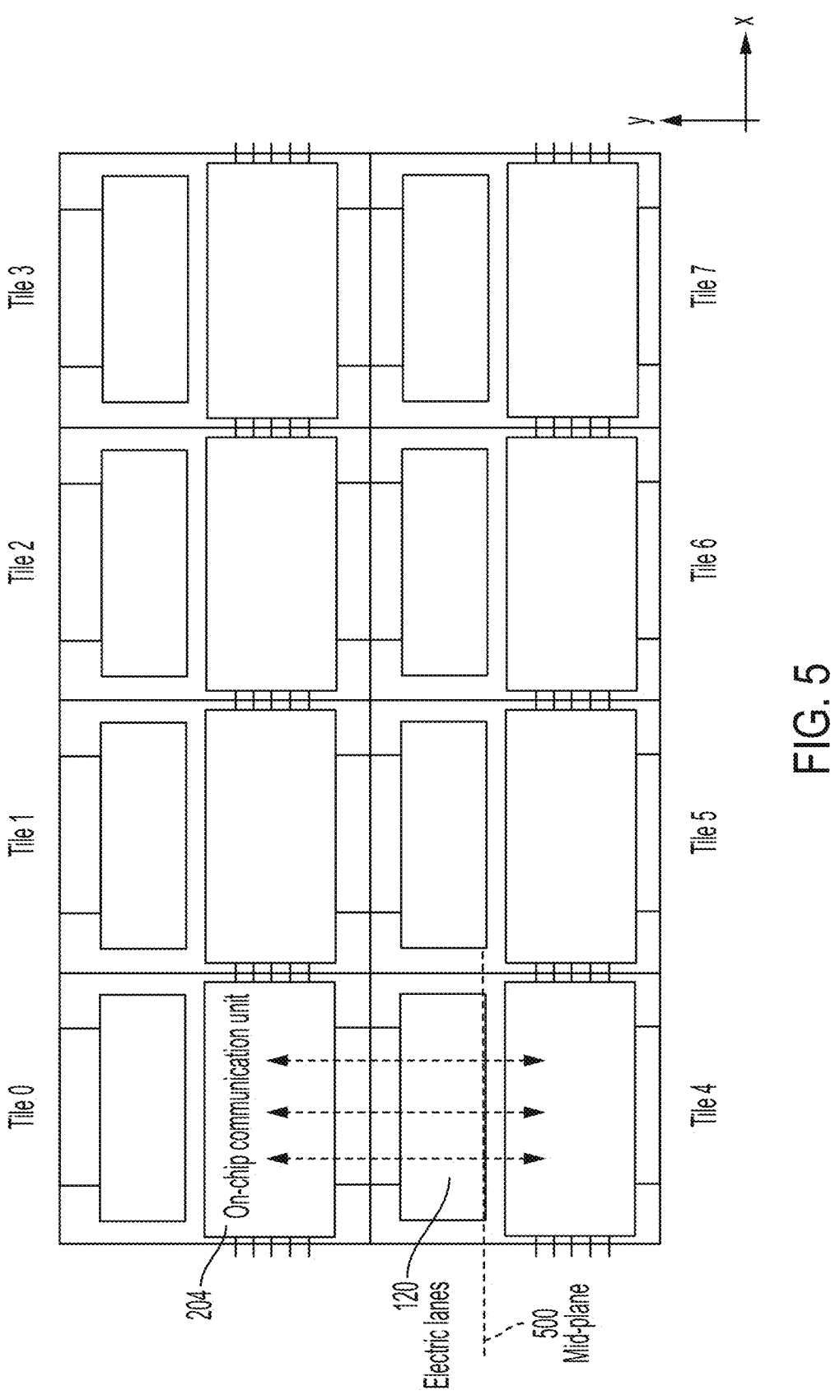
FIG. 5 is a top view of a photonic interposer patterned with eight photonic tiles of the same type, in accordance with some embodiments.

FIG. 5 illustrates an example of a photonic interposers having eight reticles of the same type, the type shown in FIG. 4. In this example, because the on-chip communication units are positioned on the southern region of the tiles, the electric lanes connecting adjacent tiles are relatively long, potentially crossing the mid-plane of either of the photonic tiles (see, e.g., mid-plane 500). Here, the mid-plane represents an imaginary plane, extending parallel to the x-axis and z-axis, that cuts a tile in two equal halves. In some embodiments, the electric lanes may be more than 15 mm in length, more than 20 mm, more than 25 mm, or more than 30 mm. Given the relatively long nature of these lanes, attenuation may be significant. To reduce the negative effects of attenuation, analog repeaters may be employed. Analog repeaters may be positioned at electronic nodes 122 (FIG. 3) and/or may be distributed along the length of an electric lane.

Figures 6A, 6B:
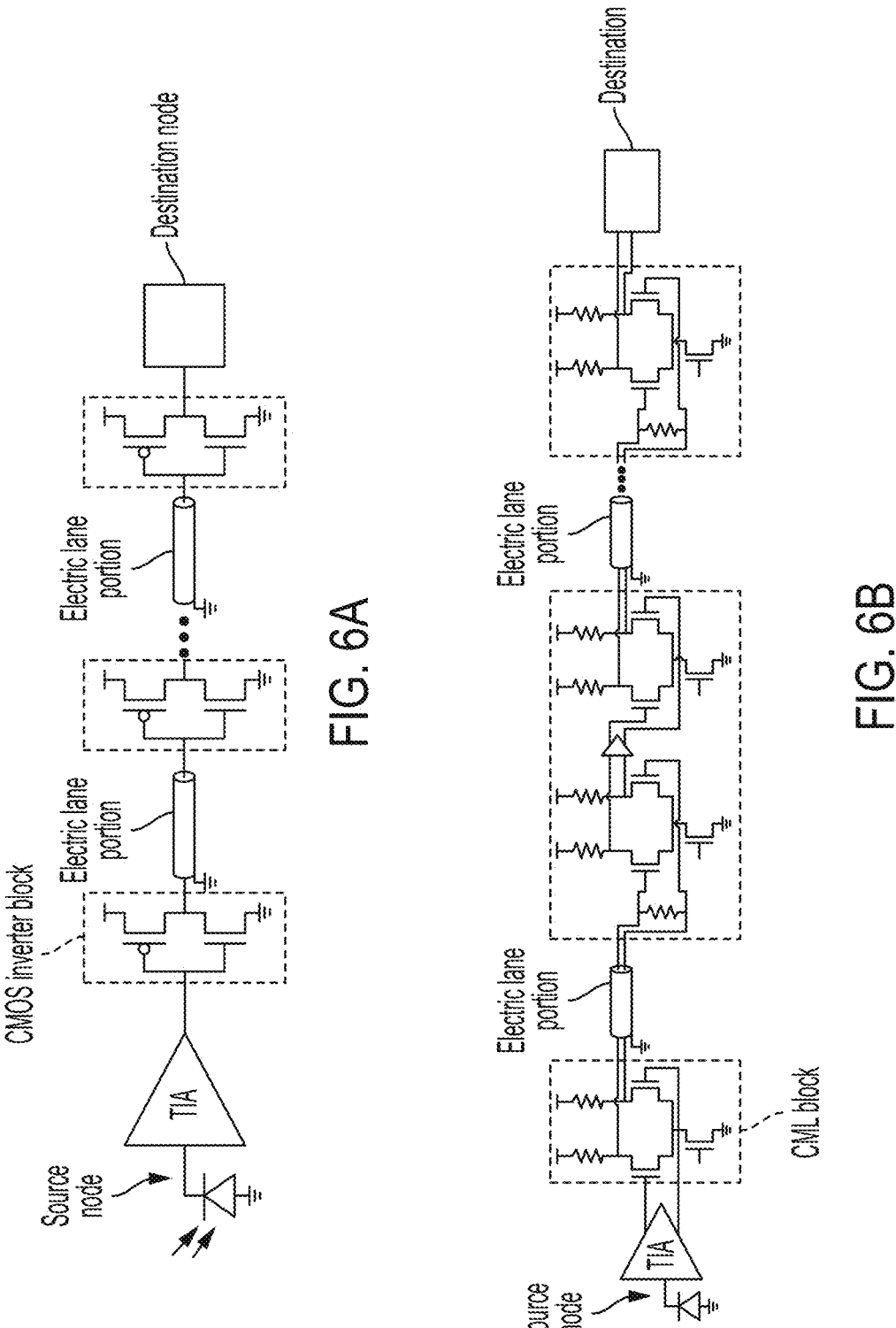
FIG. 6A is a circuit diagram of a single-ended analog repeater, in accordance with some embodiments.
FIG. 6B is a circuit diagram of a differential analog repeater, in accordance with some embodiments.

FIG. 6A and FIG. 6B are circuit diagrams illustrating examples of analog repeaters. Both repeaters connect a source node (including a photodetector and a trans-impedance amplifier in this example) to a destination node. The repeaters are distributed along the length of an electric lane, thus separating the electric lane in portions. The repeater of FIG. 6A is single-ended and includes complementary metal oxide semiconductor (CMOS) inverter blocks. The repeater of FIG. 6B is differential and includes current-mode logic (CML) blocks. Given its CML nature, the repeater of FIG. 6B can operate at higher frequencies relative to the repeater of FIG. 6A.

Figure 7:
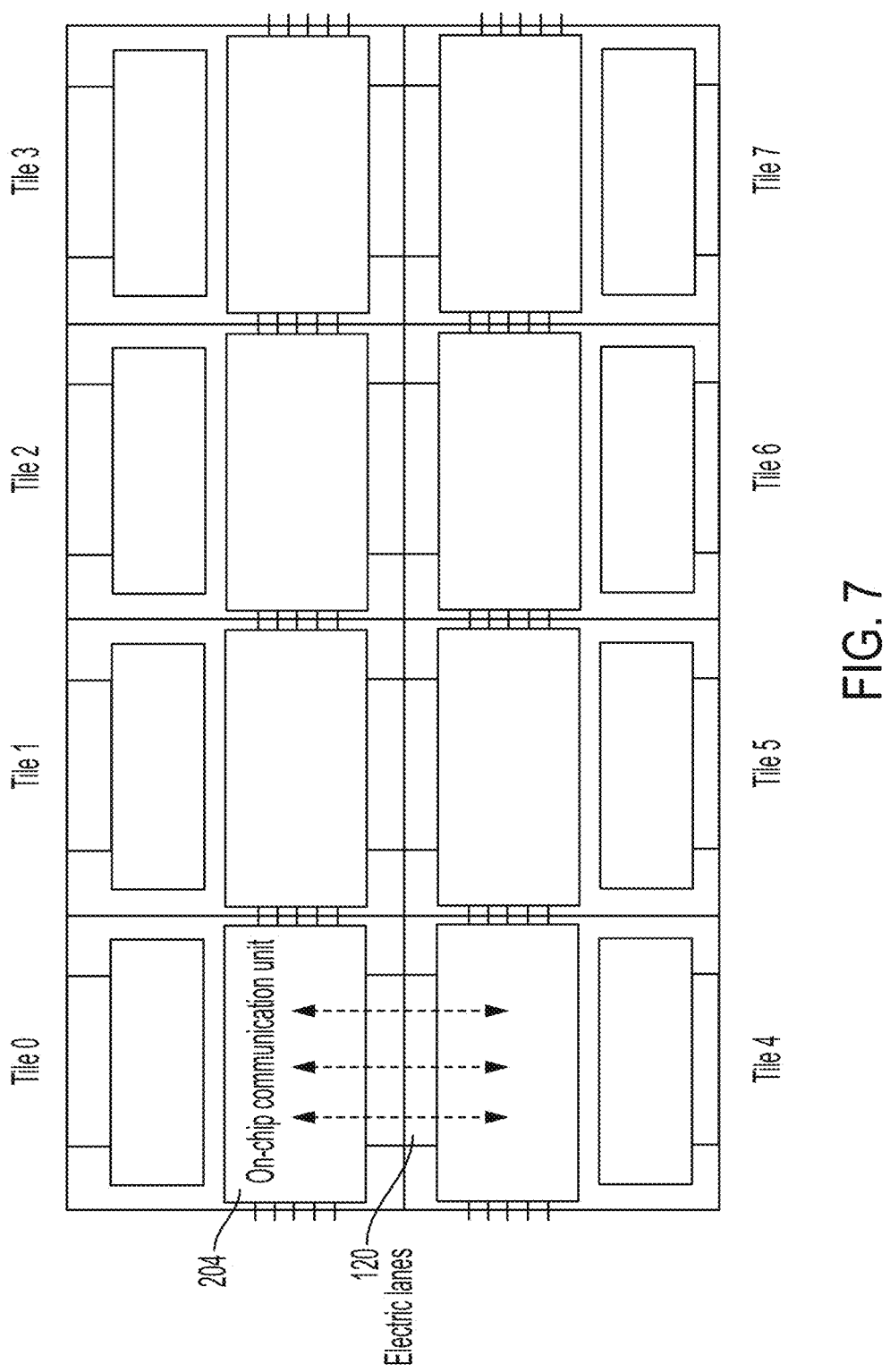
FIG. 7 is a top view of a photonic interposer patterned with four photonic tiles of a first type and four photonic tiles of a second type, in accordance with some embodiments.

In the example photonic interposer of FIG. 7, the electric lanes are shortened by arranging two rows to have tiles of different types. The top row is the same as the top row of FIG. 5. However, the bottom row is a mirror image of the first row. The tiles of the second row are obtained by a 180 degree rotation of the reticle. The result is that the on-chip communication units of the top row are positioned on the southern region of the tiles and the on-chip communication units of the bottom row are positioned on the northern region of the tiles. This reduces the length of the electric lanes. For example, the electric lanes may be less than 20 mm in length, less than 15 mm, less than 10 mm, or less than 5 mm. In some embodiments, the electric lanes do not cross the mid-plane of either of the photonic tiles. Given the shorter nature of the lanes, analog repeaters may be omitted, thus simplifying the architecture of the interposer and reducing costs.

Figure 8:
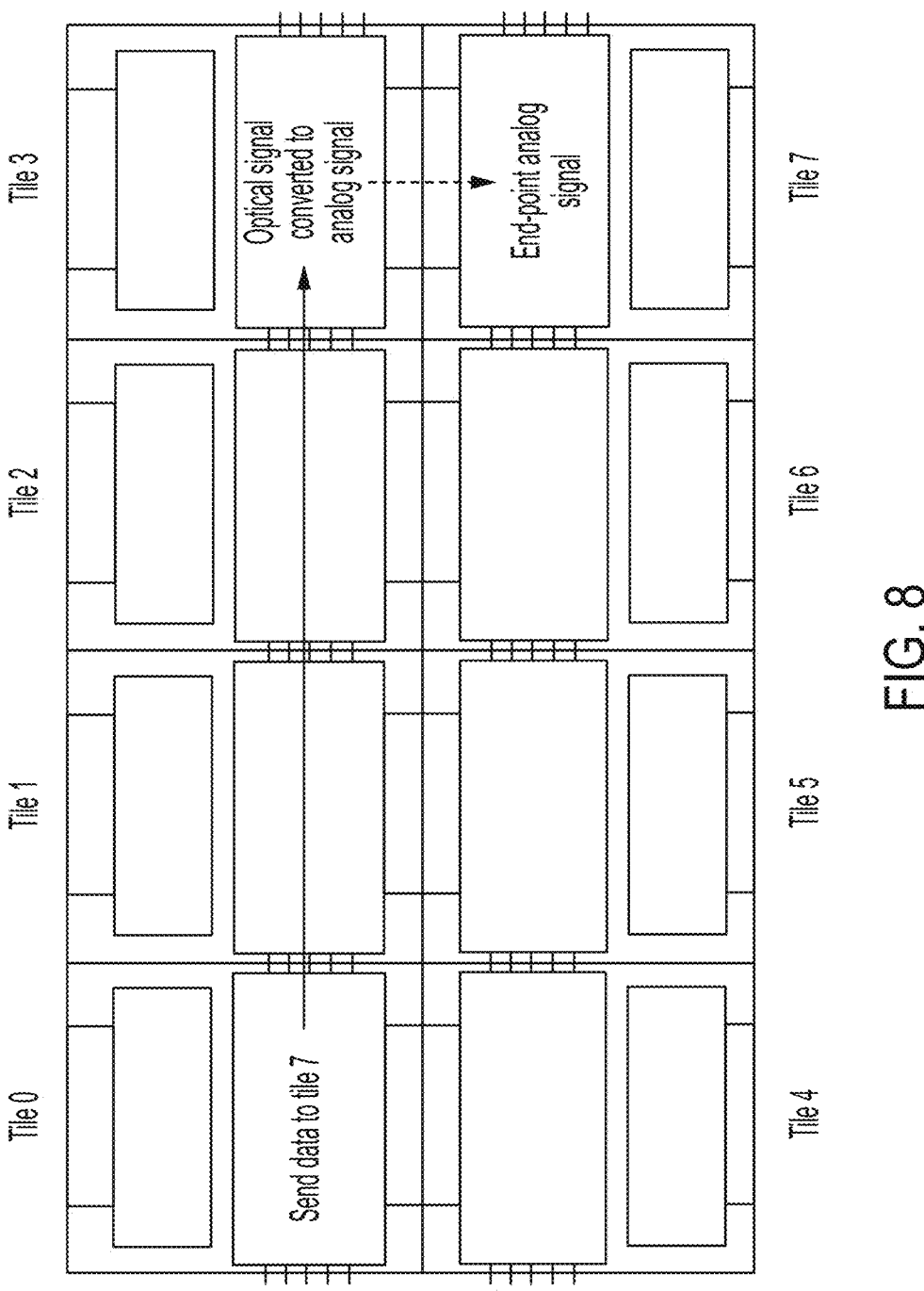
FIG. 8 is a top view of a photonic interposer supporting communication between photonic tiles disposed diagonally from one another, in accordance with some embodiments.

FIG. 8 illustrates how communication between tiles positioned diagonally from each other (being in different rows and different columns) may take place in some embodiments. In this example, tile 0 is to send data to tile 7. First, the data may be transferred from the source photonic tile (tile 0) to an intermediate photonic tile (tile 3) using a photonic lane. Then, the data may be transferred from the intermediate photonic tile (tile 3) to the destination photonic tile (tile 7) using an electric lane. At the intermediate tile, the data is converted from optical to electric. Alternatively, data may first be transferred electrically from the source tile to another intermediate tile, and then optically to the destination tile. In this case, the data is converted from electric to optical at the intermediate tile.

Figure 9:
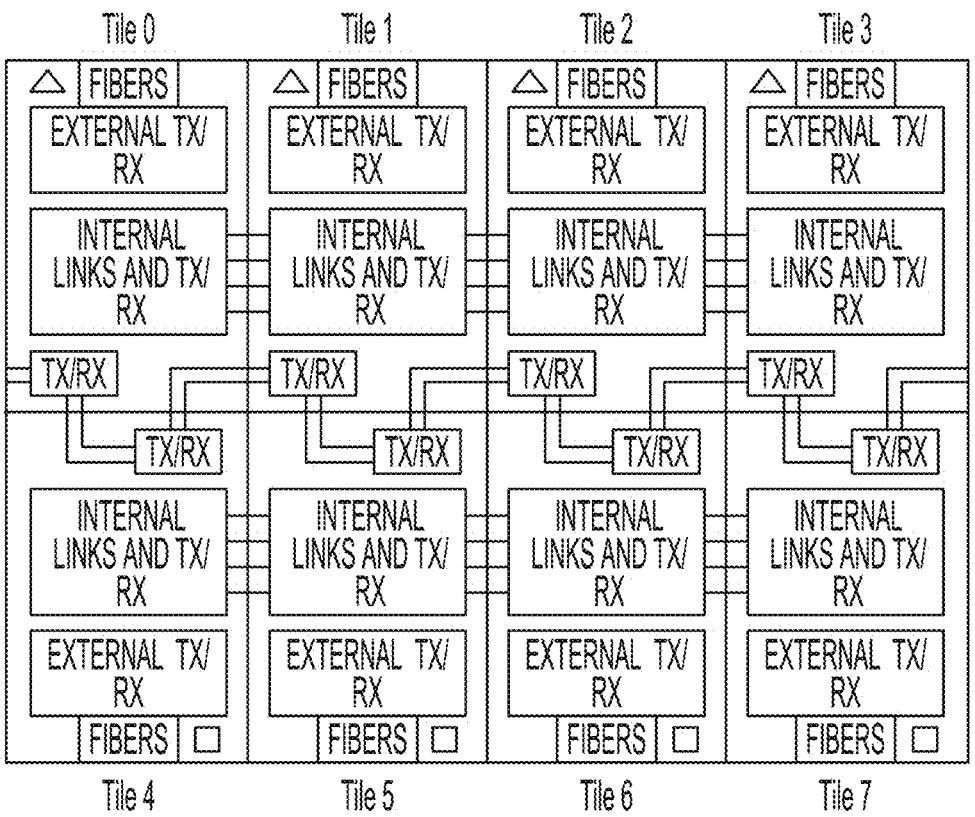
FIG. 9 is a top view of another photonic interposer patterned with four photonic tiles of a first type and four photonic tiles of a second type, in accordance with some embodiments.

FIG. 9 illustrates another example of a photonic interposer having tiles of two different types. Unlike the example of FIG. 7, the tiles of the second row are not merely mirror images of the tiles of the first row, bat rather, are formed from a different template reticle altogether. In other words, reticles are stitched together in a row alternating fashion.

IV. Additional Remarks

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic interposer comprising:
   a photonic integrated circuit (PIC) lithographically patterned with an array of photonic tiles, each photonic tile comprising an on-chip communication unit, wherein the array of photonic tiles is arranged in rows and columns;
   a plurality of electric lanes placing the on-chip communication units of photonic tiles of different rows in electrical communication with one another; and
   a plurality of photonic lanes placing the on-chip communication units of photonic tiles of different columns in optical communication with one another, wherein the array comprises a first row of photonic tiles and a second row of photonic tiles adjacent the first row, wherein the photonic tiles of the first row are of a first type and the photonic tiles of the second row are of a second type different from the first type.

2. The photonic interposer of claim 1, wherein the second type of photonic tiles is a mirrored version of the first type of photonic tiles.

3. The photonic interposer of claim 1, wherein the electric lanes do not cross mid-planes of the photonic tiles of either the first or the second row.

4. The photonic interposer of claim 1, wherein each photonic tile of the PIC comprises photonic nodes optically coupled to the photonic lanes, each photonic node comprising a controllable optical switch configured to selectively couple photonic tiles of the same row with each other.

5. The photonic interposer of claim 4, wherein each photonic node further comprises a transceiver configured to perform electrical-optical conversion.

6. The photonic interposer of claim 1, further comprising a plurality of electronic dies disposed on the PIC, each electronic die being coupled to a respective photonic tile of the array, wherein the electric lanes and the photonic lanes permit communication among the plurality of dies.

7. The photonic interposer of claim 1, wherein each photonic tile comprises a fiber coupler configured to connect to a respective optical fiber.

8. A photonic interposer comprising:
a photonic integrated circuit (PIC) lithographically patterned with an array of photonic tiles, each photonic tile comprising an on-chip communication unit, wherein the array of photonic tiles is arranged in rows and columns, wherein the array comprises a first row of photonic tiles and a second row of photonic tiles adjacent the first row, wherein the photonic tiles of the first row and the photonic tiles of the second row are of the same type;
a plurality of electric lanes placing the on-chip communication units of photonic tiles of different rows in electrical communication with one another;
a plurality of photonic lanes placing the on-chip communication units of photonic tiles of different columns in optical communication with one another; and
analog repeaters, coupled to the electric lanes, configured to transmit electric signals across boundaries of adjacent tiles.

9. The photonic interposer of claim 8, wherein the electric lanes cross respective mid-planes of the photonic tiles of the first row.

10. The photonic interposer of claim 8, wherein each photonic tile of the PIC comprises photonic nodes optically coupled to the photonic lanes, each photonic node comprising a controllable optical switch configured to selectively couple photonic tiles of the same row with each other.

11. The photonic interposer of claim 10, wherein each photonic node further comprises a transceiver configured to perform electrical-optical conversion.

12. The photonic interposer of claim 8, further comprising a plurality of electronic dies disposed on the PIC, each electronic die being coupled to a respective photonic tile of the array, wherein the electric lanes and the photonic lanes permit communication among the plurality of dies.

13. The photonic interposer of claim 8, wherein each photonic tile comprises a fiber coupler configured to connect to a respective optical fiber.

14. A photonic interposer comprising:
a photonic integrated circuit lithographically patterned with an array of photonic tiles, each photonic tile comprising an on-chip communication unit, wherein the array of photonic tiles is arranged in rows and columns; and
a controller configured to control the on-chip communication units of the photonic tiles to perform inter-tile communication between adjacent rows of the array electrically and to perform inter-tile communication between adjacent columns of the array optically, wherein controlling the on-chip communication units comprises transferring data from a source photonic tile positioned at a first row and a first column to a destination photonic tile positioned at a second row and a second column, wherein transferring the data comprises:
driving, using the data, a photonic lane coupling the source photonic tile to an intermediate photonic tile positioned at the first row and the second column; and
driving, using the data, an electric lane coupling the intermediate photonic tile to the destination photonic tile.

15. The photonic interposer of claim 14, wherein transferring the data further comprises performing optical-electrical conversion on the data at the intermediate photonic tile.

16. The photonic interposer of claim 14, wherein controlling the on-chip communication units comprises performing a memory read operation between a processor die coupled to the source photonic tile and a memory die coupled to the destination photonic tile.

17. The photonic interposer of claim 14, wherein controlling the on-chip communication units comprises transferring data from a source photonic tile positioned at a first row and a first column to a destination photonic tile positioned at a second row and a second column, wherein transferring the data comprises:
driving, using the data, an electrical lane coupling the source photonic tile to an intermediate photonic tile positioned at the second row and the first column; and
driving, using the data, a photonic lane coupling the intermediate photonic tile to the destination photonic tile.

18. The photonic interposer of claim 14, wherein controlling the on-chip communication units comprises transferring data from a first electronic die coupled to a first photonic tile to a second electronic die coupled to a second photonic tile.

19. A method of controlling a photonic integrated circuit comprising an array of photonic tiles, wherein the array of photonic tiles is arranged in rows and columns, the method comprising:
transferring data from a source photonic tile of the array positioned at a first row and a first column to a destination photonic tile of the array positioned at a second row and a second column, wherein transferring the data comprises:
driving, using the data, a photonic lane coupling the source photonic tile to an intermediate photonic tile of the array positioned at the first row and the second column; and
driving, using the data, an electric lane coupling the intermediate photonic tile to the destination photonic tile.

20. The method of claim 19, wherein transferring the data further comprises performing optical-electrical conversion on the data at the intermediate photonic tile.

21. The method of claim 19, wherein transferring the data permits a memory read operation between a processor die coupled to the source photonic tile and a memory die coupled to the destination photonic tile.

* * * * *